United States Patent
Elhaddad et al.

(10) Patent No.: US 9,560,661 B2
(45) Date of Patent: Jan. 31, 2017

(54) ALLOCATION OF SHARED RESOURCES FOR VIRTUALIZED NETWORKING

(71) Applicant: Microsoft Corporation, Redmond, WA (US)

(72) Inventors: Mahmoud Elhaddad, Newcastle, WA (US); Mitesh Desai, Sammamish, WA (US); Yatharth Gupta, Kirkland, WA (US); Henrique Filgueiras, Kirkland, WA (US); Mukund Sankaranarayan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 13/900,366

(22) Filed: May 22, 2013

(65) Prior Publication Data

US 2014/0348073 A1 Nov. 27, 2014

(51) Int. Cl.
*H04W 28/04* (2009.01)
*H04W 72/08* (2009.01)
*H04L 12/873* (2013.01)
*H04L 12/841* (2013.01)
*H04W 28/18* (2009.01)

(52) U.S. Cl.
CPC ............ *H04W 72/08* (2013.01); *H04L 47/283* (2013.01); *H04L 47/52* (2013.01); *H04W 28/18* (2013.01)

(58) Field of Classification Search
CPC ...... H04W 24/00; H04W 28/04; H04W 72/04; H04W 80/04; H04W 88/06
See application file for complete search history.

(56) References Cited

U.S. PATENT DOCUMENTS

| | | | |
|---|---|---|---|
| 4,958,341 A | | 9/1990 | Hemmady et al. |
| 5,960,365 A | * | 9/1999 | Leih .................. H04W 8/26 455/515 |
| 6,862,265 B1 | | 3/2005 | Appala et al. |
| 7,554,975 B2 | | 6/2009 | Smith |
| 7,936,675 B2 | | 5/2011 | Bailey et al. |
| 8,248,945 B1 | | 8/2012 | Sathe et al. |

(Continued)

FOREIGN PATENT DOCUMENTS

| | | |
|---|---|---|
| EP | 2259509 A | 12/2010 |
| EP | 2493235 A1 | 8/2012 |

OTHER PUBLICATIONS

Banchs, et al., "Providing Throughput and Fairness Guarantees in Virtualized WLANs through Control Theory", Retrieved at <<http://www.hamilton.ie/ppatras/pub/monet12.pdf>>, In Journal of Mobile Networks and Applications, vol. 17, Issue 4, Aug. 2012, pp. 11.

(Continued)

*Primary Examiner* — Andrew Lee
(74) *Attorney, Agent, or Firm* — Sunah Lee; Judy Yee; Micky Minhas

(57) ABSTRACT

Technology for allocating network adapter resources such as air interface time and queue space amongst multiple virtual network stations or other virtual adapters is disclosed. As one example, the resource allocation may be based on analysis of the relative latency, jitter, or bandwidth considerations for applications communicating via each of the multiple virtual adapters. The resource allocation may also be based on how efficiently each of the virtual adapters utilized previously allocated resources.

20 Claims, 5 Drawing Sheets

(56) References Cited

U.S. PATENT DOCUMENTS

| | | | |
|---|---|---|---|
| 8,270,423 | B2 | 9/2012 | Plamondon et al. |
| 8,370,838 | B1 | 2/2013 | Omelyanchuk et al. |
| 2003/0069938 | A1 | 4/2003 | Russell |
| 2003/0069939 | A1 | 4/2003 | Russell |
| 2004/0100980 | A1 | 5/2004 | Jacobs et al. |
| 2005/0060445 | A1 | 3/2005 | Beukema et al. |
| 2005/0201403 | A1 | 9/2005 | Wang |
| 2005/0232279 | A1 | 10/2005 | Brown et al. |
| 2006/0123204 | A1 | 6/2006 | Brown et al. |
| 2007/0105589 | A1* | 5/2007 | Lu ............... 455/556.2 |
| 2007/0268903 | A1 | 11/2007 | Nakagawa |
| 2007/0280105 | A1* | 12/2007 | Barkay et al. ........ 370/229 |
| 2007/0280175 | A1* | 12/2007 | Cheng et al. ........ 370/338 |
| 2008/0126564 | A1 | 5/2008 | Wilkinson |
| 2008/0205348 | A1* | 8/2008 | Malladi ............. 370/335 |
| 2009/0031046 | A1 | 1/2009 | Ruan et al. |
| 2009/0073882 | A1 | 3/2009 | McAlpine et al. |
| 2009/0254924 | A1* | 10/2009 | Anirudh et al. ....... 719/321 |
| 2011/0007746 | A1 | 1/2011 | Mudigonda et al. |
| 2011/0125905 | A1* | 5/2011 | Baucke et al. ........ 709/226 |
| 2011/0292792 | A1 | 12/2011 | Zuo et al. |
| 2011/0312288 | A1* | 12/2011 | Fu et al. ............. 455/88 |
| 2012/0033673 | A1 | 2/2012 | Goel |
| 2012/0159132 | A1 | 6/2012 | Abel et al. |
| 2012/0271903 | A1* | 10/2012 | Luna ............... 709/213 |
| 2013/0138836 | A1 | 5/2013 | Cohen et al. |
| 2013/0194938 | A1* | 8/2013 | Immonen et al. ....... 370/252 |
| 2013/0254264 | A1* | 9/2013 | Hankinson ........ H04L 29/06047 709/203 |
| 2013/0308565 | A1* | 11/2013 | Riegel .............. 370/329 |
| 2014/0003449 | A1* | 1/2014 | Li ................. 370/468 |
| 2014/0078970 | A1* | 3/2014 | Guo et al. ........... 370/329 |
| 2014/0105007 | A1* | 4/2014 | Pathmasuntharam et al. ............... 370/230 |
| 2014/0348073 | A1 | 11/2014 | Elhaddad et al. |

OTHER PUBLICATIONS

Rivera, et al., "Virtualization of Wireless Network Interfaces Wi-Fi IEEE 802.11", Retrieved at <<http://www.wseas.us/e-library/conferences/2010/Catania/TELE-INFO/TELE-INFO-07.pdf>>, In the Proceedings of the 9th WSEAS International Conference on Telecommunications and Informatics, May 2010, pp. 6.

"Virtualization at the RF Layer", Retrieved at <<http://www.wifisecured.com/technology-rflayer.asp>>, Retrieved Date: Mar. 7, 2013, p. 1.

"Meru Networks Brings Virtualization to Wireless LANs", Retrieved at <<http://www.gulftelenews.com/Article_Full_View.php?art=411&pcat=42&subCat=44>>, Nov. 10, 2008, pp. 2.

"Introduction to Intelligent Grouping and Resource Sharing (IGRS)", Retrieved at <<http://hes-standards.org/doc/SC25_WG1_N1346.pdf>>, A Technical White Paper, Retrieved Date: Mar. 7, 2013, pp. 8.

Guo, et al., "SecondNet: A Data Center Network Virtualization Architecture with Bandwidth Guarantees", Retrieved at <<www.stanford.edu/~shyang/Site/home_files/15-Guo.pdf>>, In Proceedings of the 6th International Conference on Emerging Networking Experiments and Technologies, Nov. 30, 2010, pp. 12.

Chandra, et al., "MultiNet: Connecting to Multiple IEEE 802.11 Networks Using a Single Wireless Card", Retrieved at <<http://research.microsoft.com/pubs/73564/multinet_infocom.pdf>>, In Twenty-third Annual Joint Conference of the IEEE Computer and Communications Societies, Mar. 2004, pp. 12.

Rao, et al., "Simplistic Constructive Routing Protocol for Multihop Wireless Mesh Networks", Retrieved at <<http://www.ijaest.iserp.org/archieves/16-Aug-1-15-11/Vol-No.9-Issue-No.2/19.IJAEST-Vol-No-9-Issue-No-2-Simplistic-Constructive-Routing-Protocol-for-Multihop-Wireless-Mesh-Networks-268-272.pdf>>, In International Journal of Advanced Engineering Sciences and Technologies, vol. 9, Issue 2, Retrieved Date: Mar. 6, 2013, pp. 5.

Anonymous: "Intel VMDq Technology", Internet Citation, Mar. 2008 (Mar. 2008), pp. 1-22, XP002695771, [retrieved on Apr. 18, 2013].

International Search Report/Written Opinion mailed Feb. 19, 2014, in PCT App. No. PCT/US2013/060495, 12 pages.

International Search Report/Written Opinion dated Mar. 27, 2014 in PCT/US2013/060255, 13 pages.

Non-Final Office Action dated Mar. 27, 2015 in U.S. Appl. No. 13/907,858, 13 pages.

Non-Final Office Action dated Oct. 7, 2015 in U.S. Appl. No. 13/907,858, 14 pages.

Notice of Allowance dated Apr. 25, 2016 in U.S. Appl. No. 13/907,858, 6 pages.

* cited by examiner

ALLOCATION OF SHARED RESOURCES FOR VIRTUALIZED NETWORKING

BACKGROUND

Virtualization technology enables physical resources to be shared by multiple virtual devices. As one example of such technology, multiple virtual stations or other virtual adapters may be associated with an underlying network adapter (i.e., a network interface card or a network controller). These multiple virtual adapters may provide network connectivity or access to a communications medium via the underlying network adapter's physical resources such as buffers, wireless radio(s), other kind of transceiver(s), and/or antenna(s). For example, virtual adapters may provide this connectivity or access to applications such as user-mode programs, kernel-mode processes, virtual machines, or the like.

In these and other scenarios, multiple applications or multiple virtual adapters may contend for the same resources (e.g., the resources associated with the underlying network adapter). Such contention may result in connectivity problems (e.g., slow data rates, dropped connections, difficulty in establishing connections, etc.). In addition, such contention may lead to inefficient usage of the resources associated with the underlying network adapter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology for allocating network adapter resources amongst multiple virtual network stations or other virtual adapters is disclosed. As one example, the resource allocation may be based on analysis of the relative latency, jitter, or bandwidth considerations for applications communicating via each of the multiple virtual adapters. The resource allocation may also be based on how efficiently each of the virtual adapters utilized previously allocated resources.

As one example, the disclosed technology may be employed with Wi-Fi virtualization to allocate resources such as a network adapter, components of the network adapter (e.g., queue space, other memory, signal processing components, receivers, transmitters, antennas, etc.), capacity between a host and the network adapter, access to a communication medium, or the like. In addition, the disclosed technology may be employed to enable multiple virtual Wi-Fi stations or virtual Wi-Fi access points to operate on a single computing device. The disclosed technology may also be employed in conjunction with Wi-Fi Direct to facilitate both peer-to-peer connection(s) and infrastructure connection(s) over a single radio. However, the disclosed technology is not limited to these examples.

Other aspects of and applications for the disclosed technology will be appreciated upon reading and understanding the attached figures and description.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
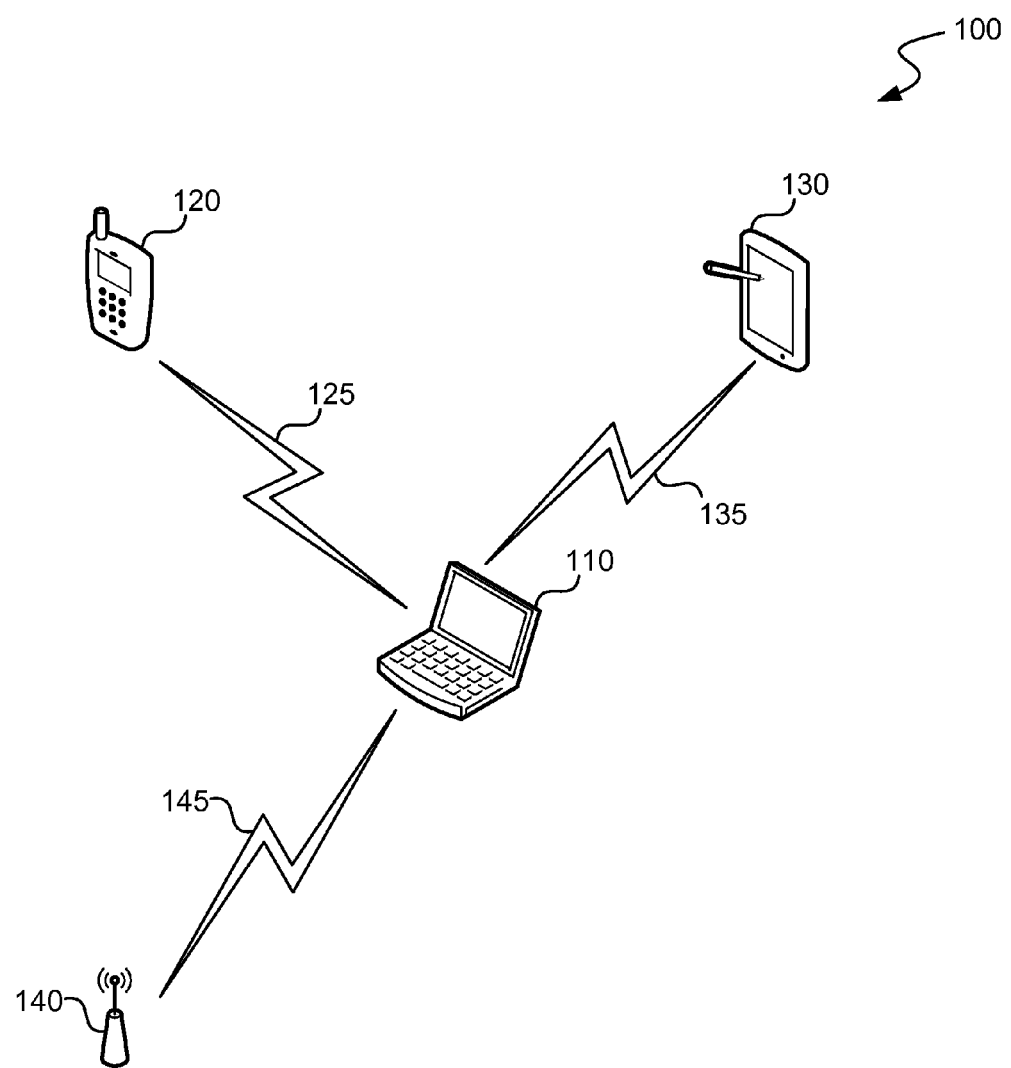
FIG. 1 is a diagram illustrating one example of a suitable environment in which aspects of the technology may be employed.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Introduction

Technology for allocating network adapter resources amongst multiple virtual network stations or other virtual adapters is disclosed. As one example, the resource allocation may be based on analysis of the relative latency, jitter, or bandwidth considerations for applications communicating via each of the multiple virtual adapters. The resource allocation may also be based on how efficiently each of the virtual adapters utilized previously allocated resources.

As one non-limiting example, the disclosed technology may be employed with Wi-Fi virtualization to allocate resources such as a network adapter, components of the network adapter (e.g., queue space, other memory, signal processing components, receivers, transmitters, antennas, etc.), capacity between a host and the network adapter, access to a communication medium, or the like. In addition, the disclosed technology may be employed to enable multiple virtual Wi-Fi stations or virtual Wi-Fi access points to operate on a single computing device. The disclosed technology may also be employed in conjunction with Wi-Fi Direct to facilitate both peer-to-peer connection(s) and infrastructure connection(s) over a single underlying network adapter.

As a more detailed example, a single computing device may host multiple virtual Wi-Fi adapters that are configured to interface with any one or more networks via a shared wireless radio. In this example, the disclosed technology may be employed to manage the transfer of data (e.g., protocol data units) from virtual Wi-Fi adapter queues (e.g., in virtual adapter drivers or in virtual adapters) to queues of a network adapter, manage the transmission of data from the network adapter queues, manage the time that the wireless radio listens for data directed to each of the virtual adapters on their respective channels, or the like.

In managing these and other resources, the disclosed technology may automatically allocate resources based on the type of traffic originating from or destined to the virtual adapters, provide a "minimum" resource allocation to each virtual adapter, and resolve allocation or resource conflicts between various virtual stations. In these and other manners, the disclosed technology may enable greater utilization of network adapters and provide improved communications to and from virtual adapters.

Illustrative Devices/Operating Environments

FIG. 1 is a diagram of environment 100 in which aspects of the technology may be practiced. As shown, environment 100 includes computing devices 110, 120, and 130, as well as access point 140. As one non-limiting example, computing device 110 is configured to communicate with computing devices 120 and 130 as well as with access point 140 via wireless links 125, 135, and 145, respectively.

Computing device 110, along with computing devices 120 and 130, may be virtually any type of general- or specific-purpose computing device. For example, these computing devices may be user devices such as desktop computers, laptop computers, tablet computers, display devices, cameras, printers, or smartphones. Likewise, these computing devices may also be server devices such as application server computers, virtual computing host computers, or file server computers.

In the illustrated example, computing devices 110 and 120 are configured to communicate with each other over wireless link 125 while computing devices 110 and 130 are configured to communicate with each other over wireless link 135. As one example, wireless links 125 and 135 are Wi-Fi peer-to-peer links such as Wi-Fi Independent Basic Service Set (IBSS) links, Mesh Basic Service Set (MBSS) links, or Wi-Fi Direct links. However, there is no requirement for wireless links 125 and 135 to be either Wi-Fi links or peer-to-peer links. For example, wireless links 125 and 135 may be ZigBee links or Bluetooth links. In fact, wireless links 125 and 135 may employ any suitable air interface protocols or standards, or other communications protocols or standards, including those discussed above.

As illustrated, environment 100 also includes access point 140 which is linked to computing device 110 via wireless link 145. Access point 140 may be, for example, a Wi-Fi access point that is configured to provide a Basic Service Set (BSS) link between computing device 110 and a backend network such as the Internet or an intranet. However, access point 140 may alternately or additionally be any other type of device that provides access to a network or resource. For example, access point 140 may be a wireless repeater, a femtocell, an access point for a wide area network or metropolitan area network (e.g., a WiMax base station, a 4G base station, a Long Term Evolution (LTE) base station, etc.), or the like. In addition, access point 140 may either be a stand-alone/hardware access point or a Software Enabled Access Point (SoftAP), e.g., operating on a general-purpose computing device or on a smart phone. As with wireless links 125 and 135, wireless link 145 may also employ any suitable communications protocols or standards.

As shown in environment 100, computing device 110 is configured to communicate with computing devices 120 and 130, as well as with access point 140, via wireless links 125, 135, and 145, respectively. As discussed above, the communications over these links and with these devices/access points may be conducted by computing device 110 via separate networks using Wi-Fi virtualization technology. As one example, computing device 110 may include only a single physical wireless network adapter but be configured with multiple virtual adapters and associated components that enable sharing of the single physical wireless network adapter. However, in other examples, computing device 110 includes more than one physical wireless network adapter.

In implementing Wi-Fi virtualization technology, computing device 110 may also include any number of virtual adapters and associated components of any one or more types. For example, computing device 110 may include both a virtual non-access point Wi-Fi station as well as a virtual Wi-Fi SoftAP. In this example, the non-access point Wi-Fi station and the Wi-Fi SoftAP may be separate Wi-Fi entities that appear to upper level applications as independent/separate media access control/physical layer interfaces. Computing device 110 may also employ any of the allocation technology described herein to allocate shared resources amongst the virtual adapters or amongst applications that utilize the virtual adapters. This allocation technology may, for example, enable computing device 110 to maintain separate connections to multiple devices. In one example, these separate connections are via separate networks but over a shared network adapter.

Although the above example is described in the context of a combining a virtual non-access point Wi-Fi station with a virtual Wi-Fi SoftAP on computing device 110, combinations of any other number or types of virtual adapters may be employed. For example, the described technology may be employed in conjunction with virtualization of multiple standards or protocols over the same network adapter. As one example, a Wi-Fi station and a WiMax station may be virtualized over a single physical radio. As another example, a WiMax station and a Bluetooth interface may be virtualized over a shared network adapter. As yet a further example, a Wireless Mesh Network adapter and a Wi-Fi adapter may be virtualized on the same computing device. These and other examples are possible implementations of the disclosed technology.

Figure 2:
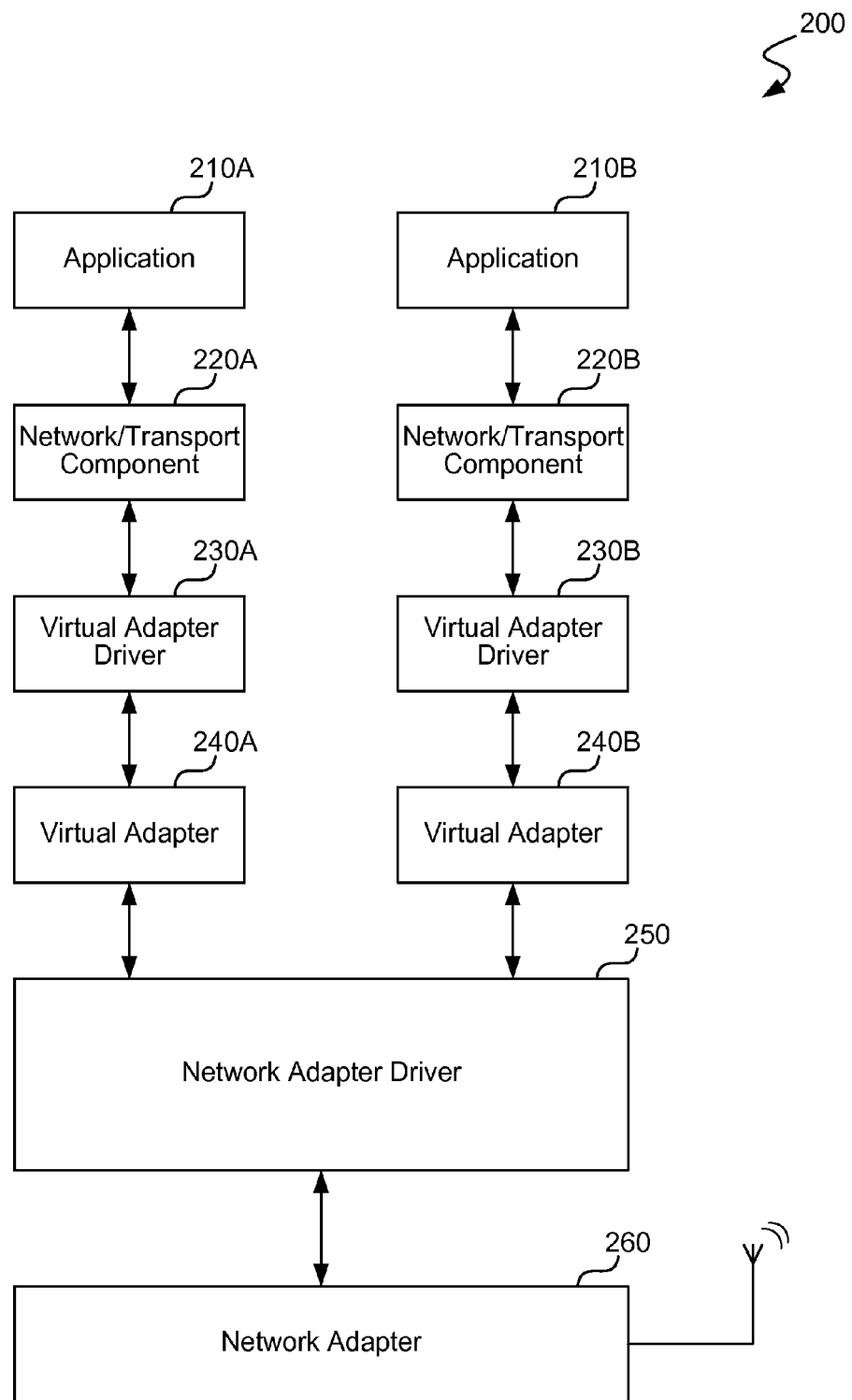
FIG. 2 is a block diagram illustrating functional blocks of a computing device in which aspects of the technology may be employed.

FIG. 2 is a block diagram illustrating functional blocks of computing device 200, which may be an embodiment of computing device 110, 120, or 130 of FIG. 1. As illustrated, computing device 200 includes applications 210A and 210B, network/transport components 220A and 220B, virtual adapter drivers 230A and 230B, virtual adapters 240A and 240B, network adapter driver 250, and network adapter 260. Although two sets of applications, network/transport components, virtual adapter drivers, and virtual adapters are illustrated in computing device 200, this is merely for clarity of illustration. Any number of applications may be associated with a particular virtual adapter path and any number of virtual adapters paths may be employed in a particular computing device.

Applications 210A and 210B may include any type of application that may receive or transmit data over a network or other communications medium, or be otherwise coupled to a communications medium. For example, applications 210A and 210B may include user-mode programs, kernel-mode processes, virtual machines, or the like. Likewise, applications 210A and 210B may also include programs or components that interface other devices or components to a communications medium.

In one typical example, applications 210A and 210B are configured to communicate with applications on other computing devices over a communications link, but may not be "aware of" or "concerned with" the underlying communications infrastructure. For example, the structure/organization of the underlying virtual and physical network adapters are typically abstracted away from, are not relevant to, and are not shared with applications 210A and 210B. In other words, applications 210A and 210B may be "unaware" that they are communicating via virtualized network adapters.

Applications 210A and 210B may be respectively interfaced to virtual adapters 240A and 240B via network/transport components 220A and 220B and virtual adapter drivers 230A and 230B. For example, network/transport components 220A and 220B may provide functionality typically associated with layers 3, 4, or higher of the Open System Interconnection (OSI) model. As one example, network/transport components 220A and 220B convert data from/for the applications to/from Transmission Control Protocol (TCP), User Datagram Protocol (UDP), and Internet Protocol (IP) packets. Optionally, network/transport components 220A and 220B may be part of an operating system.

In addition, virtual adapter drivers 230A and 230B may provide respective interfaces between network/transport components 220A and 220B and virtual adapters 240A and 240B. For example, virtual adapter drivers 230A and 230B may be adapted to provide interface, translation, and abstraction functionalities commonly associated with device drivers. As one example, virtual adapter drivers 230A and 230B may provide functionality typically associated with layers 2 and lower of the OSI model.

As shown, virtual adapters 240A and 240B are configured to interface applications 210A and 210B to lower levels interfaces such as network adapter driver 250 and network adapter 260. For example, virtual adapters 240A and 240B may each be a virtual non-access point Wi-Fi adapter, a virtual Wi-Fi SoftAP adapter, a WiMax adapter, a Bluetooth interface, a Wireless Mesh Network adapter, a ZigBee interface, or the like. However, the above examples are merely some of the many possible virtual adapters that may be employed with the disclosed technology. Further, each virtual adapter may couple computing device 200 to a separate network, e.g., to enable computing device 200 to maintain simultaneous connections with multiple networks over a shared network adapter. However, multiple virtual adapters on one computing device may alternately be configured to provide multiple connections to the same network. These and other possibilities are encompassed by the disclosed technology.

In computing device 200, network adapter driver 250 is configured to interface both virtual adapters 240A and 240B to network adapter 260, for example, by providing the interface, translation, and abstraction functionalities commonly associated with device drivers. In addition, network adapter driver 250 may also be configured to provide or enable some or all of the resource allocation technology described herein. For example, one implementation of network adapter driver 250 is adapted to receive data from applications 210A and 210B via the paths associated with virtual adapters 220A and 220B then dynamically allocate resources associated with network adapter 260 to virtual adapters 240A and 240B and applications 210A and 210B. As one example, network adapter driver 250 is adapted to analyze the data and to allocate resources to applications 210A and 210B and virtual adapters 240A and 240B based on communications characteristics (such as latency requirements, bandwidth requirements, or jitter requirements) determined from the analysis of the data.

Network adapter driver 250 may also be adapted to determine how efficiently previously allocated resources were utilized by the applications or virtual adapters to which they were allocated and to reallocate resources or base later allocations on the prior utilization. Likewise, network adapter driver 250 may be adapted to resolve conflicts in the allocation of resources between to the various virtual stations. Further details regarding these and other features are provided below in conjunction with FIG. 3.

In the example of computing device 200, network adapter 260 is adapted to interface computing device 200 to a wireless medium under the control of network adapter driver 250, e.g., by enabling transmission and reception of data to the wireless medium via an air interface. As one example, network adapter 260 is a physical Wi-Fi adapter embodied in what may commonly be referred to as a "wireless card." These and other examples of network adapter 260 may include a wireless receiver and a wireless transmitter that are respectively adapted to receive and transmit data via the wireless medium under the control of network adapter driver 250. In addition, certain implementations of network adapter 260 may be half-duplex network interfaces. For example, network adapters that are designed to operate with half-duplex duplex protocols may be half-duplex interfaces. However, other network adapters may be full duplex interfaces.

In addition, network adapter 260 may also include a finite amount of queue space (e.g., to buffer data to be transmitted, to buffer received data before it is transferred to network adapter driver 250, etc.), other memory, and signal processing resources. These and other resources may be allocated with the described technology.

In typical implementations, applications 210A and 210B, virtual adapters 240A and 240B, and network adapter driver 250 would be implemented in software (e.g., either part of the operating system, as user-mode software, kernel-mode software, or as a combination of user-mode software and kernel-mode software) while network adapter 260 would be implemented in combinations of firmware and hardware. However, other implementations are possible. For example, functionalities described as implemented in network adapter 260 may be implemented in software (e.g., within network adapter driver 250 or another component) or functionalities described as performed by network adapter driver 250 may be implemented within network adapter 260. The disclosed technology may be implemented in these and other ways.

Figure 3:
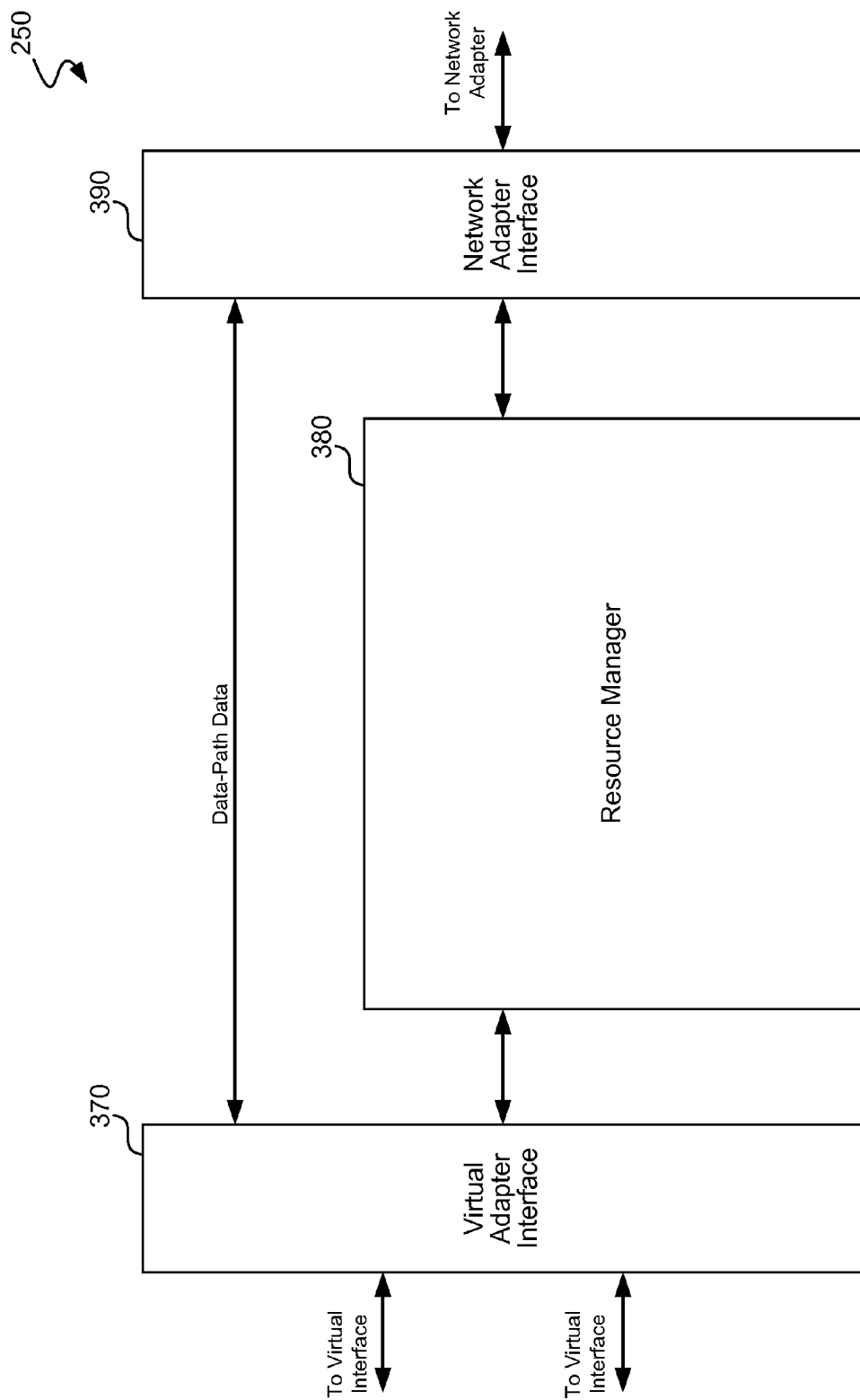
FIG. 3 is a block diagram illustrating functional blocks of network adapter driver 250 of FIG. 2.

FIG. 3 is a block diagram illustrating functional blocks of network adapter driver 250 of FIG. 2. As illustrated, network adapter driver 250 includes virtual adapter interface 370, resource manager 380, and network adapter interface 390. However, other network adapter drivers may include other, additional, or fewer components. As described above, network adapter driver 250 may be adapted to interface multiple virtual adapters to a network adapter.

Within network adapter driver 250, virtual adapter interface 370 may be adapted to provide an interface to the virtual adapters. For example, virtual adapter interface 370 may provide this interface by forwarding data-path data between the virtual adapters and network adapter interface 390, by receiving attributes regarding the data-path data (either within or separate from the data-path data), and by providing communications characteristics of the data-path data to resource manager 380. In addition, virtual adapter interface 370 may be adapted to analyze the attributes and generate the communications characteristics for resource manager 380.

As one non-limiting example, the attributes may include traffic category information such as the traffic category classifications defined by the Enhanced Distributed Channel Access (EDCA) portions of the Institute of Electrical and Electronics Engineers (IEEE) 802.11 standards. For example, such traffic category classifications may indicate that given traffic flows have been assigned voice priority, video priority, best effort priority, or background priority. In another example, the attributes may indicate a specific scenario associated with a particular application or virtual adapter, such as an Extensible Authentication Protocol (EAP) request or a Dynamic Host Configuration Protocol (DHCP) request. In these and other scenarios, the assigned EDCA traffic classifications may not adequately reflect the importance of the associated traffic or may not fully reflect the resources that should be allocated to transmit or receive the associated traffic.

Based on the attributes regarding the data-path data, virtual adapter interface 370 may generate communications characteristics and provide the generated communications characteristics to resource manager 380. As one example, the communications characteristics may be generated by associating priorities to at least two network traffic flows from different virtual network adapters and be based on EDCA classifications associated the traffic flows. In such an example, the classifications may reflect on latency, jitter, or bandwidth requirements, or other considerations associated with the traffic flows. However, in other examples, the communications characteristics may be generated by estimating bandwidth, latency, jitter, or other characteristics of the traffic flows.

Further, the communications characteristics may include or serve as requests for resources. For example, communications characteristics may include or serve as a Limited Latency Request (LLR), a Resource Availability Request (RAR), or a Bandwidth Request (BWR). In this example, a LLR may be based on the least latency or jitter tolerant application accessing a network adapter via any associated virtual adapter. A LLR may also reflect a request for the associated virtual adapter to be granted a transmit or receive opportunity according to a periodic schedule (e.g., every 50 milliseconds) and may include a tolerance for variation from the periodic schedule. Such a request may be generated by virtual adapter interface 370 in response to detection of a latency-sensitive marking in a traffic flow or in response to an application issuing an explicit request, e.g., upon entry into media streaming mode or upon connection of a voice over IP (VoIP) call. A LLR request may remain in effect until it is canceled, for example, by a LLR request with latency and jitter tolerance parameter set to zero. Further, a LLR may have a greater priority than other requests.

A RAR may indicate that an application or a virtual adapter should receive guaranteed access to transmit or receive resources for a given duration, until completion of an operation, or until the RAR is canceled. Additionally, a RAR may specify a virtual adapter and an interval during which the specified virtual adapter is to have continuous access to the transmit or receive resources of a network adapter. For example, a RAR request may be issued to ensure presence of a radio on a particular channel until an EAP process has completed, a DHCP request has been fulfilled, a Wi-Fi Direct discovery or pairing process has completed, or the like. In this example, a RAR may cause resource manager 380 to hold the network adapter on the channel associated with virtual adapter for the duration of the RAR.

A BWR may specify an estimate of a bandwidth demand for an application or a virtual adapter, and may serve as a request for a statistical or other bandwidth reservation for an associated application or virtual adapter. Virtual adapter interface 370 may generate a BWR in response to a particular traffic profile with predicable bandwidth demands (e.g., video playback). For example, virtual adapter interface 370 may detect such a situation by monitoring traffic volume, Quality of Service (QoS) markings, or via receipt of a command from an application or virtual adapter. In the absence of an active BWR, bandwidth of a network adapter may be shared equally by all virtual adapters associated with the network adapter.

As introduced above, resource manager 380 may manage resources associated with a network adapter based on communications characteristics provided by virtual adapter interface 370. These managed resources may include but are not limited to queue space (e.g., in the network adapter driver, the network adapter, or both), other memory, signal processing resources, receivers, transmitters, antennas, capacity between a host and the network adapter, access to a communication medium, portions of a radio transmission or reception schedule, or the like. At a high level, this resource allocation may be based on analysis of the relative latency, jitter, or bandwidth considerations for applications communicating via each of the multiple virtual adapters associated with the network adapter.

More specifically, resource manager 380 may allocate transmission resources through use of transmit tokens. In such an example, each virtual adapter may be associated with a transmit token bucket and have transmit tokens added to its buckets in proportion to its bandwidth allocation. At any given time, resource manager 380 may service the virtual adapter with greatest number of tokens, for example, by issuing a requesting to transmit data frames from that virtual adapter's queue. Alternately, resource manager 380 may service a virtual adapter by moving data frames from that virtual adapter's queue closer to transmission (e.g., by moving the data frames from a network adapter driver queue to a network adapter queue). The number of transmit tokens may then be decreased in proportion to the amount of data that was moved or transmitted. Additionally, the number of data frames that may be transmitted or moved in a single service may be limited in any suitable manner. As one example, a transmit or move limit may be implemented by capping the number of transmit tokens that can be in a transmit bucket.

Additionally, if a LLR is in force, resource manager 380 may service the virtual adapter associated with the LLR before servicing the virtual adapter with the greatest number of transmit tokens. For example, resource manager 380 may service the virtual adapter associated with the LLR based on the last time that that virtual adapter was serviced.

Resource manager 380 may also optionally employ a token or credit based mechanism (e.g., receive queue tokens and receive queue token buckets) to allocate receive resources. Such mechanisms may be employed if host packet processing or a host/network adapter interface (rather than network adapter resources) is a likely receive-chain bottleneck. In such situations, resource manager 380 may service receive queues based solely on receive queue tokens or based on a combination of receive queue tokens and LLR requests.

Other receive path resource allocation, such as allocation of channel monitoring time, may also be performed by resource manager 380. For example, such allocation may be performed if a network adapter cannot monitor the receive path for all associated virtual adapters at the same time. As one example, resource manager 380 may be adapted to perform receive path resource allocation if the various virtual adapters are configured to receive data via different channels or via different air interface standards or protocols. In such a situation, resource manager 380 may also maintain receiver time tokens and receiver time token buckets that to define how long a network adapter is to monitor/dwell on given channel while servicing a virtual adapter's receive path. Such monitoring/dwelling on a channel may be defined in terms of an absolute duration to be tuned to a channel, as a duration to remain on a channel after receiving a beacon, or the like. In addition, monitoring/dwelling on a channel may be have a higher priority than data transmission, monitoring for beacons, or the like. However, other suitable priority schemes may be employed for these and other operations.

As introduced above, resource manager 380 may also receive feedback regarding how efficiently previously allocated resources were utilized by the applications or virtual adapters to which they were allocated and reallocate resources or base later allocations on the this feedback. For example, this feedback may be received from a network adapter via network adapter interface 390 and may be indicative of an actual over-the-air transmission rate of virtual adapter, transmission of data from a particular virtual adapter over an air interface during a scheduled transmission time, or the like. Further, such feedback may be employed to prevent a virtual adapter that unable to utilize its allocated resources (e.g., due to a congested channel, a non-responsive receiver, or other problems) from being allocated resources that could be better utilized by other virtual adapters.

In addition, the feedback may be based on information for any one or more prior periods. As one specific example, the feedback may include a moving average of information from a predefined number of beacon periods. However, any other suitable feedback may be employed. Further, if a virtual adapter is associated with multiple remote peers, e.g., if the virtual adapter is operating as Wi-Fi SoftAP, or as a member of an IBSS, efficiency may be received or determined on a per-remote-peer basis. In this example, information for each remote peer, such as each remote peer's address, may be employed to track efficiency in a manner that captures potential differences in communications conditions between the various remote peers and that avoids penalizing unaffected peers.

As also introduced above, resource manager 380 may be adapted to allocate a minimum resource allocation to each virtual adapter, regardless of the respective priorities of traffic from the other virtual adapters. For example, this minimum resource allocation may prevent high-priority traffic on one virtual adapter from monopolizing resources and causing other virtual adapters to drop connections. In one specific example, resource manager 380 may allocate air interface access time to each virtual adapter based upon the amount of time needed by that virtual adapter to maintain an established wireless connection. However, any other suitable allocation scheme may be employed.

Resource manager 380 may also be adapted to resolve allocation conflicts or resource conflicts between various virtual adapters, for example, if there are conflicts between various LLRs, RARs, or BWRs. In one example, resource manager 380 will not allow conflicting RARs to be in effect at the same time. For example, RARs that require multiple virtual adapters associated with the same network adapter to access different channels at the same time may be considered conflicting RARs. In another example, resource manager 380 will not allow conflicting LLRs to be in effect at the same time, but may allow a RAR to temporarily violate a preexisting LLR. In this example, such a determination may be based on the relative priorities associated with the relevant applications or virtual adapters.

Further, in some situations, a network adapter may not be available to receive one or more beacons for a virtual adapter. For example, such a situation may occur if multiple virtual adapters are associated with BSSs having synchronized beacons, if a channel schedule parameters or a RAR requires tuning of a radio to away from a channel for an extended duration (e.g., longer than a beacon interval), or the like. In these and other situations, resource manager 380 may cause the network adapter to broadcast a sleep mode message on behalf of an associated virtual adapter.

Within network adapter driver 250, network adapter interface 390 is adapted to interface network adapter driver 250 to a network adapter. For example, network adapter interface 390 may be adapted to pass data between virtual adapter interface 370 and the network adapter, and be adapted to control the network adapter based on the output of resource manager 380. Continuing with this example, network adapter interface 390 may provide queue servicing parameters such as bandwidth allocations per virtual adapter or average or absolute frequencies for servicing queues of a particular virtual adapter. Further, network adapter interface 390 may also provide channel scheduling parameters to the network adapter, e.g., in response to a RAR. Such channel scheduling parameters may include a maximum time between visits to a given channel and the minimum dwell time per visit.

In addition, network adapter interface 390 may also provide the feedback information to resource manager 380 from the network adapter. For example, network adapter interface 390 may poll the network adapter for feedback, or may receive the feedback information provided at the initiative of the network adapter. These and other variations are possible.

Illustrative Processes

Figure 4:
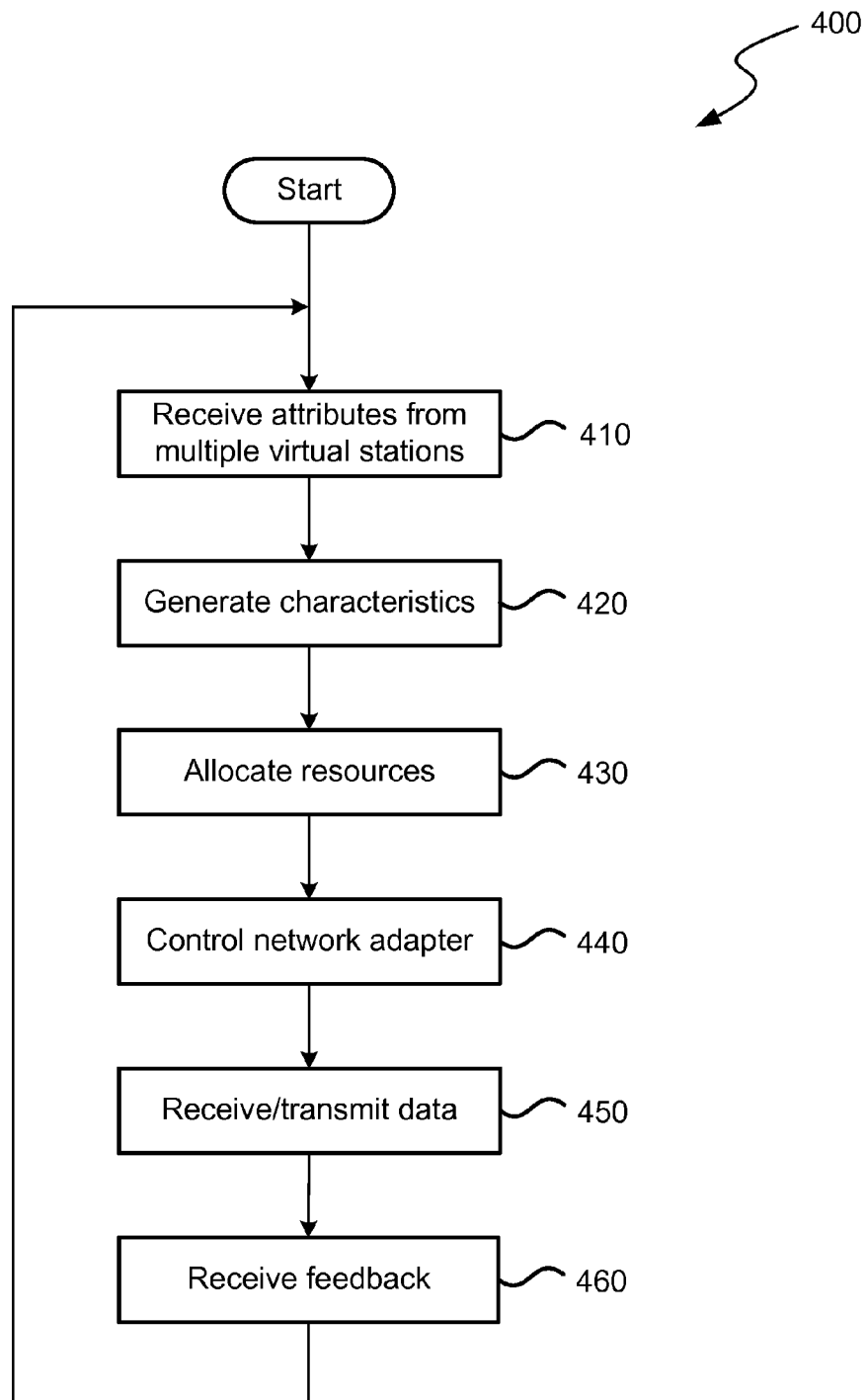
FIG. 4 is a logical flow diagram illustrating a process for allocating shared resources and operating a network adapter according to aspects of the technology.

FIG. 4 is a logical flow diagram illustrating process 400 for allocating shared resources, e.g., amongst multiple virtual adapters, and operating a network adapter. For clarity, process 400 is described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into process 400 or other processes, whether or not that technology is specifically described in conjunction with a process. Process 400 may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Process 400 begins at 410 where attributes are received from multiple virtual stations. In one implementation, these attributes are received at virtual adapter interface 370 from applications associated with each of the multiple virtual stations. These attributes may be received as part of, or separately from, data-path data that is to be forwarded to network adapter 260 via network adapter interface 390.

Following receipt of the attributes, virtual adapter interface 370 may generate communications characteristics at 420. For example, these communications characteristics may include requests such as LLRs, RARs, or BWRs, or may be generated by associating priorities to at least two network traffic flows based on EDCA traffic classifications.

Processing then flows to 430 where resource manager 380 may allocate resources, for example, based on the communication characteristics generated at 420. These resources may be allocated using any of the above-discussed technology and be provided to network adapter interface 390.

At 440, network adapter interface 390 of network adapter driver 250 may control network adapter 260 based on the output of resource manager 380. As one example, this control may include controlling the loading of data-path data into queues of network adapter 260 or instructing network adapter 260 to transmit or receive data. Further, at 450, network adapter 260 transmits or receives data under the control of network adapter interface 390.

Processing then flows 460 where network adapter interface 390 receives feedback from network adapter 260 regarding how efficiently previously allocated resources were utilized.

From 460, processing may loop back to 410 for the allocation of additional resources and the transmission or reception of additional data. As discussed above, the feedback received at 460 may be employed to allocate or reallocate resources for the handling of the additional data.

Illustrative Devices/Operating Environments

Figure 5:
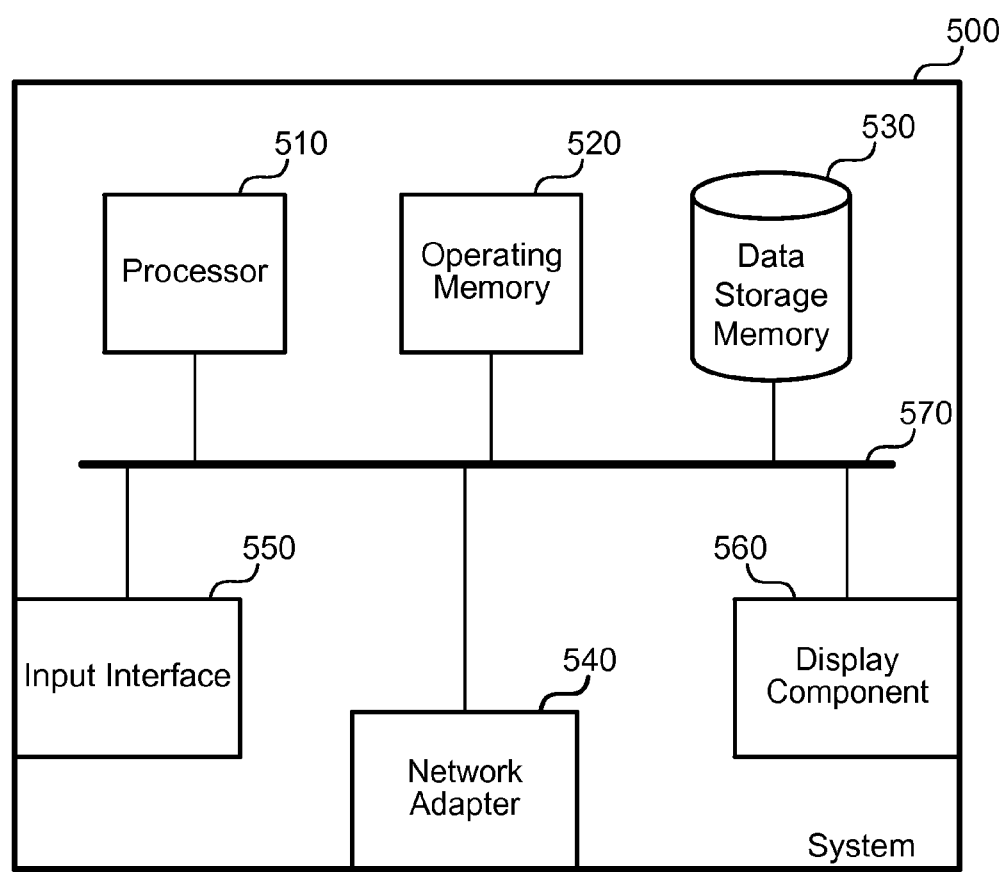
FIG. 5 is a block diagram illustrating example hardware components of a computing device in which aspects of the technology may be practiced.

FIG. 5 is a high-level illustration of example hardware components of computing device 500, which may be used to practice various aspects of the technology. For example, computing device 500 may be employed to perform process 400 of FIG. 4. Computing device 500 may also be an embodiment of computing device 200 of FIG. 2. As shown, computing device 500 includes processor 510, operating memory 520, data storage memory 530, network adapter 540, input interface 550, and display component 560. These aforementioned components may be interconnected by bus 570.

As with computing device 200, computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be server device such as an application server computer, a virtual computing host computer, or a file server computer.

Computing device 500 includes at least one processor 510 configured to execute instructions, such as instructions for implementing the above-described processes or technology. The aforementioned instructions, along with other data (e.g., datasets, metadata, operating system instructions, etc.), may be stored in operating memory 520 and/or data storage memory 530. In one example, operating memory 520 is employed for run-time data storage while data storage memory 530 is employed for long-term data storage. However, each of operating memory 520 and data storage memory 530 may be employed for either run-time or long-term data storage. Each of operating memory 520 and data storage memory 530 may also include any of a variety of data storage devices/components, such as volatile memories, semi-volatile memories, non-volatile memories, random access memories, static memories, disks, disk drives, caches, buffers, or any other media that can be used to store information. However, operating memory 520 and data storage memory 530 specifically do not include or encompass communications media, any communications medium, or any signals per se.

Also, computing device 500 may include or be coupled to any type of computer-readable media such as computer-readable storage media (e.g., operating memory 520 and data storage memory 530) and communication media (e.g., communication signals and radio waves). While the term computer-readable storage media includes operating memory 520 and data storage memory 530, this term specifically excludes and does not encompass communications media, any communications medium, or any signals per se.

Network adapter 540 maybe an embodiment of network adapter 260 of FIG. 2.

Computing device 500 also includes input interface 550, which may be configured to enable computing device 500 to receive input from users or from other devices. In addition, computing device 500 includes a display component 560, which may be configured to render displays. In one example, display component 560 includes a frame buffer, graphics processor, graphics accelerator, or a virtual computing host computer and is configured to render the displays for presentation on a separate visual display device (e.g., a monitor, projector, virtual computing client computer, etc.). In another example, display component 560 includes a visual display device and is configured to render and present the displays for viewing.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A method of sharing use of a shared physical radio amongst multiple virtual wireless stations, comprising:
   receiving information from each of multiple virtual wireless stations operating on a single computing device, wherein each of the multiple virtual stations is configured to communicate with an air interface via the shared physical radio, the information including attributes associated with latency and/or bandwidth characteristics of multiple applications communicating over the shared physical radio via respective corresponding virtual stations of the multiple virtual stations;

allocating a radio transmission schedule of the shared physical radio and/or a radio reception schedule of the shared physical radio based at least in part on the latency and/or bandwidth characteristics of each of the multiple applications; and transmitting data to and/or receiving data from the multiple virtual stations according to the allocated radio transmission schedule and/or the radio reception schedule.

2. The method of claim 1, wherein allocating the radio transmission schedule and/or the radio reception schedule includes:
determining the latency and/or bandwidth characteristics from the received information.

3. The method of claim 1, wherein allocating the radio transmission schedule and/or the radio reception schedule includes:
assigning receiver access tokens and/or transmitter access tokens to each of the multiple virtual stations based on bandwidth characteristics of the corresponding applications.

4. The method of claim 1, wherein:
transmitting and/or receiving data includes receiving data by at least two of the multiple virtual stations; and
allocating the radio transmission schedule and/or the radio reception schedule includes:
allocating frequencies at which each of the at least two virtual stations are granted use of a receiver of the shared physical radio; and
allocating receiver dwell durations for each of the at least two virtual stations.

5. The method of claim 1, wherein allocating the radio transmission schedule and/or the radio reception schedule includes:
allocating the radio transmission schedule and/or the radio reception schedule based at least in part on minimum air interface access time needed by each of the multiple virtual stations to maintain established wireless connections.

6. The method of claim 1, wherein allocating the radio transmission schedule and/or the radio reception schedule includes:
allocating a radio transmission time reservation and a radio reception time reservation to a particular virtual station in response to a request by the particular virtual station to establish a wireless connection.

7. The method of claim 1, wherein allocating the radio transmission schedule and/or the radio reception schedule includes:
allocating radio resource access frequencies to each of the multiple virtual stations based at least in part on latency and/or jitter characteristics associated with each of the multiple applications;
allocating radio receiver dwell durations to the multiple virtual stations based at least in part on bandwidth characteristics associated with each of the multiple applications; and
allocating queue resource characteristics based at least in part on the latency, jitter, and/or bandwidth characteristics associated with each of the multiple applications.

8. The method of claim 1, wherein:
allocating the radio transmission schedule and/or the radio reception schedule includes allocating the radio transmission schedule;
the method further comprises receiving feedback from the shared physical radio regarding transmission over an air interface during a scheduled transmission time; and
the method further comprises reallocating the radio transmission schedule based at least in part on the feedback.

9. The method of claim 1, wherein at least two of the multiple virtual stations are simultaneously configured to operate according to different air interface protocols.

10. The method of claim 1, wherein at least two of the multiple virtual stations are simultaneously configured to operate on different wireless channels.

11. A non-transitory computer-readable storage medium having instructions stored therein for performing perform operations to share the use of a physical network adapter, the operations comprising:
receiving information from each of multiple virtual network adapters that access shared resources associated with the physical network adapter, the information from each of multiple virtual network adapters including an attribute associated with at least one application communicating over the physical network adapter via that virtual network adapter;
dynamically determining an allocation of the shared resources based at least in part on the attributes; and
controlling access to the shared resources based at least in part on the dynamically determined allocation.

12. The non-transitory computer-readable storage medium of claim 11, wherein dynamically determining the allocation includes:
associating priorities to at least two network traffic flows based on traffic classifications associated with each of the at least two network traffic flows, each of the at least two network traffic flows being associated with a specific virtual network adapter; and
determining the allocation based on the associated priorities.

13. The non-transitory computer-readable storage medium of claim 11, wherein dynamically determining the allocation includes:
determining the allocation based on estimated bandwidth characteristics for each of the multiple virtual network adapters.

14. The non-transitory computer-readable storage medium of claim 11, wherein dynamically determining the allocation includes:
determining the allocation based bandwidth requests, latency requests, and/or reservation requests associated with at least one of the multiple virtual network adapters.

15. The non-transitory computer-readable storage medium of claim 11, wherein dynamically determining the allocation includes:
dynamically determining the allocation based at least in part on prior utilization of previously allocated resources.

16. The non-transitory computer-readable storage medium of claim 11, wherein controlling access to the shared resources includes:
controlling transmission over the physical network adapter, including controlling transmissions from a transmission queue and/or controlling allocation of space within the transmission queue.

17. A computing device for providing multiple virtual network adapters, comprising:
- a physical radio adapted to transmit and receive data via a wireless medium; and
- a memory and a processor that are respectively adapted to store and execute instructions that:
  - receive attributes for multiple source applications, each associated with a different virtual network adapter, each of the different virtual network adapters configured to communicate via the physical radio;
  - determine, from the attributes, communications characteristics for each of the multiple source applications;
  - dynamically allocate resources associated with the physical radio based on the determined communications characteristics; and
  - enable communications by the multiple source applications over the physical radio accordingly to the dynamically allocated resources.

18. The computing device of claim 17, wherein:
the physical radio is a half-duplex radio and includes a receiver that is adapted to receive data via the wireless medium and a transmitter that is adapted to transmit data via the wireless medium; and
the instructions that dynamically allocate the resources also dynamically allocate access to the wireless medium to the receiver and to the transmitter.

19. The computing device of claim 17, wherein:
the physical radio includes a receiver that is adapted to receive data via the wireless medium; and
the instructions that dynamically allocate the resources also dynamically assign frequencies at which the receiver is allocated to service each of the virtual network adapters and dynamically determines lengths of time, following receipts of beacons, that the receiver continues to service each of the virtual network adapters.

20. The computing device of claim 17, wherein:
the instructions that dynamically allocate the resources also dynamically allocate air interface time for use by the multiple virtual adapters based at least in part on prior utilization of previously allocated air interface time.

* * * * *